(12) United States Patent
Washington et al.

(10) Patent No.: US 7,108,095 B1
(45) Date of Patent: Sep. 19, 2006

(54) SYSTEM AND METHOD FOR GENERATING POWER

(76) Inventors: Jerry Washington, 4483 Heatherbrook Blvd., Tuscaloosa, AL (US) 35405; Dewayne Washington, 4483 Heatherbrook Blvd., Tuscaloosa, AL (US) 35405

( * ) Notice: Subject to any disclaimer, the term of this patent is extended or adjusted under 35 U.S.C. 154(b) by 451 days.

(21) Appl. No.: 10/293,506

(22) Filed: Nov. 13, 2002

(51) Int. Cl.
*B60K 25/10* (2006.01)

(52) U.S. Cl. .................. 180/165; 180/65.1; 180/65.3

(58) Field of Classification Search ............. 180/165, 180/65.1, 65.3
See application file for complete search history.

(56) References Cited

U.S. PATENT DOCUMENTS

| | | | |
|---|---|---|---|
| 2,688,704 A | 9/1954 | Christenson | 290/4 |
| 3,165,897 A | 1/1965 | Coats et al. | 60/102 |
| 3,837,219 A * | 9/1974 | Clayton | 73/117 |
| 4,282,947 A * | 8/1981 | Kemper | 180/165 |
| 4,309,620 A | 1/1982 | Bock | |
| 4,423,794 A * | 1/1984 | Beck | 180/165 |
| 4,495,451 A * | 1/1985 | Barnard | 318/150 |
| 4,606,193 A * | 8/1986 | Molina | 60/698 |
| 4,688,419 A | 8/1987 | D'Angelo et al. | |
| 4,768,607 A * | 9/1988 | Molina | 180/165 |
| 4,928,553 A * | 5/1990 | Wagner | 475/268 |
| 5,434,454 A | 7/1995 | Farkas | 290/4 |
| 5,689,174 A | 11/1997 | Pacheco, Sr. | 322/16 |
| 5,694,026 A | 12/1997 | Blanchet | 322/29 |
| 5,783,932 A | 7/1998 | Namba et al. | 322/16 |
| 6,753,619 B1 * | 6/2004 | Stevenson et al. | 290/1 R |

FOREIGN PATENT DOCUMENTS

| | | |
|---|---|---|
| GB | 721 933 | 1/1955 |
| GB | 1 207 934 | 10/1970 |

* cited by examiner

*Primary Examiner*—Paul N. Dickson
*Assistant Examiner*—Brian Swenson
(74) *Attorney, Agent, or Firm*—Paul A. Guss (57) ABSTRACT

A system and method for generating power includes a motor assembly, an inertia-assisted, torque-enhanced gearbox, including a flywheel assembly and a clutch assembly, and a generator assembly. The motor assembly is used to drive the flywheel assembly up to the generator's designed operating speed. When the flywheel assembly reaches the generator operating speed, the clutch assembly engages and connects the flywheel assembly to the generator assembly. When the flywheel assembly is connected to the generator assembly, it supplies the generator with the starting torque required to start the generator. The motor assembly then supplies the torque necessary to operate the flywheel assembly and the generator assembly at the generator's designed operating speed. When the generator encounters peak loads, the flywheel assembly also supplies peak load torques to the generator assembly. The generator assembly is operable to supply power to a load connected to the generator assembly.

18 Claims, 7 Drawing Sheets

SYSTEM AND METHOD FOR GENERATING POWER

BACKGROUND OF THE INVENTION

The present invention relates generally to systems and methods for generating electrical power. More particularly, this invention pertains to a system and method of generating power using one or more flywheels.

Power generation systems are known in the art. For example, U.S. Pat. No. 2,688,704 teaches a conventional power generation system that includes a motor that is directly connected to a generator. The motor is powered by an ac power source and is used to drive the generator at its designed operating speed. The generator, in turn, generates power based on the speed at which the motor drives the generator. The system also includes a flywheel, clutch, and combustion engine, all of which are connected to the generator. If power to the motor is interrupted, the clutch engages and the flywheel, which is rotating at the designed operating speed of the generator and contains a certain amount of kinetic energy, is used to supply power to and start the combustion engine. The combustion engine is then used to drive the generator at its designed operating speed.

The system described in the '704 patent has several disadvantages. First, directly coupling the motor to the generator as taught by the '704 patent increases the overall cost of the system. As a result of the direct coupling, the motor must be capable of supplying the starting and peak load torques for the generator, both of which are greater, and, in some cases, substantially greater, than the typical operating torque required to operate the generator at its designed operating speed and only occur during relatively small portions of the overall operating time of the generator. The generator starting torque is the torque required to start the generator, the peak load torque is the torque required to handle the peak load on the generator, and the operating torque is the torque required to maintain the generator at its designed operating speed. More importantly, these torque requirements require the selection of a motor capable of supplying the higher starting and peak load torques rather than a motor capable of supplying the lower generator operating torque. Motors capable of supplying the starting and peak load torques are more expensive than motors capable of supplying the generator operating torque.

Second, the system in the '704 patent will fail if the generator creates a load on the motor that exceeds the motor's torque output capacity. In some applications, it is difficult to accurately determine the maximum torque that will be required by a system and, as a result, it is difficult to select the correct motor for those applications. While this issue is normally dealt with by building in a safety factor and selecting a motor that has a torque output capacity a certain percentage higher, for example, 20% or 30%, than any expected torque requirements, it is possible that the safety factor can be exceeded. If the safety factor is exceeded, i.e., the torque output capability of the motor is exceeded, the motor will fail and systems that are connected to the generator and relying on its power output will be unable to operate properly. Furthermore, selecting a motor with a built in safety factor requires the selection of a motor having a higher torque capability than required for a particular application and, as indicated above, increases the overall cost the system.

What is needed, then, is a less expensive power generation system having a motor generator combination that will not fail if the generator requires torques, including starting and peak load torques, that exceed the torque output capabilities of the motor.

SUMMARY OF THE INVENTION

Accordingly, one object of the present invention is to provide a power generation system that is less expensive than conventional power generation systems.

Another object is to provide a power generation system having a motor generator combination that will not fail if the generator requires torques, including starting and peak load torques, that exceed the torque output capabilities of the motor.

These and other objects, which will become clear to someone practicing the present invention, are satisfied by the power generation system of the present invention. The system includes a motor assembly, an inertia-assisted, torque-enhanced gearbox, including a flywheel assembly and a clutch assembly, and a generator assembly. The motor assembly is operable to supply sufficient torque to drive the flywheel assembly and to operate the generator assembly at its designed operating speed. The flywheel assembly is operable to store energy and to supply torque to the generator assembly when necessary. More specifically, the flywheel assembly is operable to supply starting and peak load torque to the generator assembly when necessary. The clutch assembly is operable to engage the generator assembly with the flywheel assembly when the flywheel assembly reaches the generator's designed operating speed and to disengage it when the flywheel assembly falls below a certain percentage of that speed. The generator assembly is operable to supply power to a load connected to the generator assembly.

The flywheel assembly can be separated into two or more flywheel assemblies to reduce the torque required by the motor to spin up the flywheel assembly. The inertia-assisted, torque-enhanced gearbox may be modified to include a speed increaser to increase the speed of the flywheel assembly to increase the amount of energy stored in the flywheel assembly and a speed decreaser to decrease the speed of the flywheel assembly back down to the generator's designed operating speed. The system can also be implemented in a motorized vehicle, such as an automobile or a boat, and used to provide power to charge the vehicle's batteries.

DESCRIPTION OF THE PREFERRED EMBODIMENTS

Figure 1:
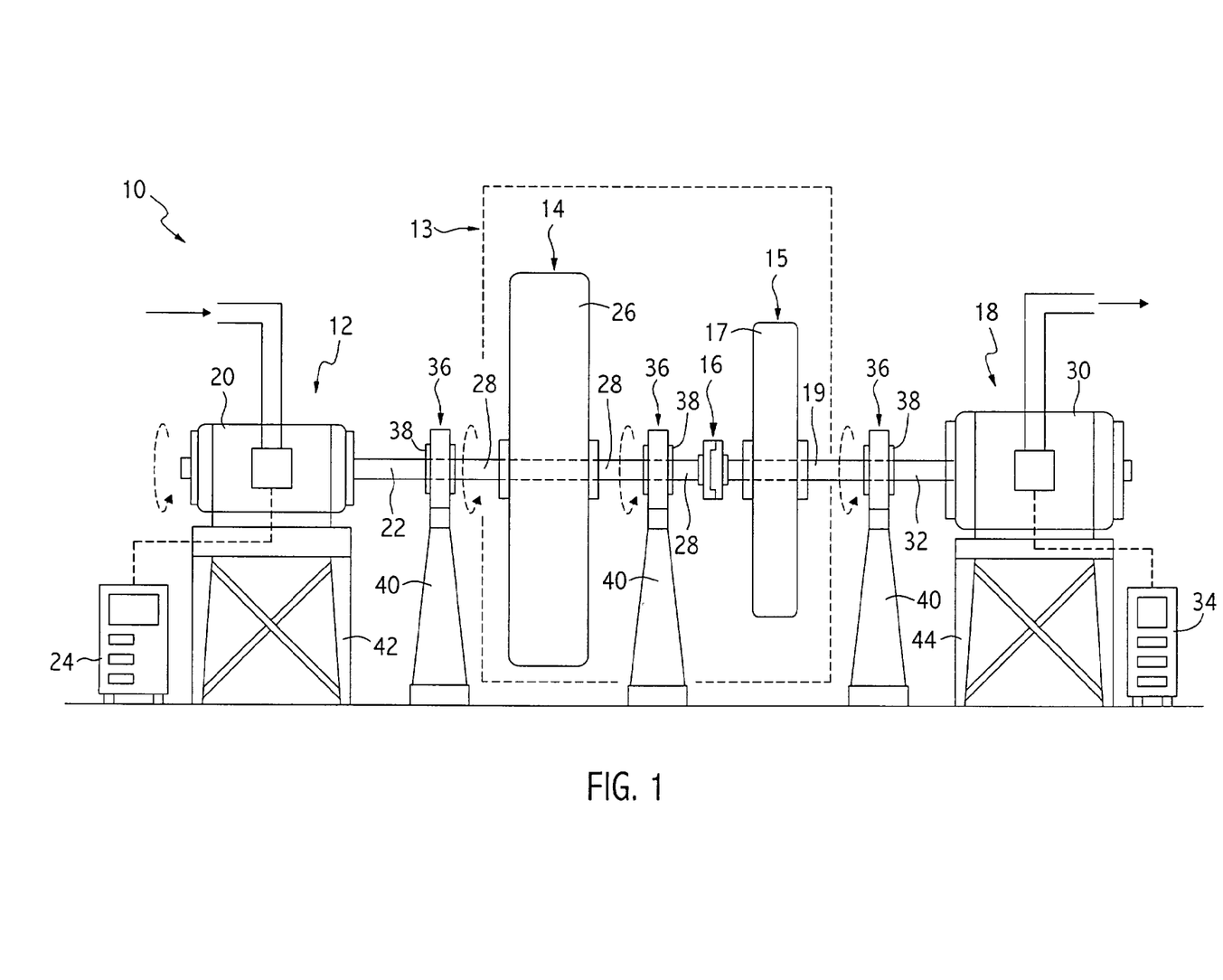
FIG. 1 is a side view of one embodiment of the power generation system of the present invention.

Referring to FIG. 1, the power generation system 10 of the present invention includes a motor assembly 12, an inertia-assisted, torque-enhance gearbox 13 including a first flywheel assembly 14, a clutch assembly 16, and a second flywheel assembly 15, and a generator assembly 18.

The motor assembly 12 includes a motor 20, a motor shaft 22, and a motor controller 24 connected to the motor 20. The first flywheel assembly 14 includes a first flywheel 26 and a first flywheel shaft 28. The second flywheel assembly 15 includes a second flywheel 17 and a second flywheel shaft 19. The generator assembly 18 includes a generator 30, a generator shaft 32, and a generator controller 34. The motor shaft 22 is connected to one end of the first flywheel shaft 28 and the clutch assembly 16 is connected to the other end of the first flywheel shaft 28. One end of the second flywheel shaft 19 is connected to the clutch assembly 16 and the other end is connected to the generator shaft 32.

The system 10 further includes a motor stand 42, which provides support for the motor 20, a generator stand 44, which provides support for the generator 30, and three bearing support assemblies 36, which provide support for the first flywheel shaft 28, the second flywheel shaft 19, and the generator shaft 32. Each bearing support assembly 36 includes a bearing assembly 38 and a bearing assembly support stand 40.

The motor 20 is a conventional motor that is connected to an ac power source (not shown) and is operable to drive the first flywheel 26 at the generator's designed operating speed. The motor controller 24 is a conventional motor controller and is operable to vary the speed and torque output of the motor 20. The first flywheel 26 and the second flywheel assembly 15 are conventional flywheels and are operable to store energy based on their rotational speeds. The size and mass of each flywheel, which determine the inertia, and indirectly the torque output capability, of each flywheel may be varied as necessary based on the torque requirements of a given application. The clutch assembly 16 is a conventional clutch assembly operable to engage the first flywheel shaft 28 with the second flywheel shaft 19 and, in turn, the generator shaft 32 when the flywheel shaft 28 rotates at the generator's designed operating speed. The generator 30 is a conventional generator that is connected to an ac power source (not shown), which supplies it with operating power, and to a load (not shown), which it supplies with power. The generator controller 34 is a conventional generator controller and is operable to gradually ramp up the output voltage and current supplied by the generator 30. The generator controller 34 also includes a conventional tachometer (not shown), which is used to measure the rotational speed of the generator 30. If the generator shaft 32 falls below the synchronous speed of the generator 30, which will cause the generator 30 to begin operating like a motor, the generator controller 34 turns the generator 30 off.

In operation, the motor 20 is used to bring the first flywheel 26 up to the generator's designed operating speed. During this stage of the process, the clutch assembly 16 is used to disengage the second flywheel shaft 19 and the generator shaft 32 from the flywheel shaft 28 so the motor 20 does not have to supply torque to the second flywheel shaft 19 or the generator shaft 32. This, in turn, allows the use of a motor that has a smaller output torque capacity than the motor that would be required to turn the second flywheel 17 and start the generator 30, and reduces the overall cost of the system.

After the first flywheel 26 is brought up to the generator's designed operating speed, the clutch assembly 16 is used to engage the second flywheel shaft 19 and the generator shaft 32. When the clutch assembly 16 is engaged, the first flywheel 26 supplies the torque necessary to turn the second flywheel 17 and start the generator 30, and spins the generator 30 up to its designed operating speed. The motor 20 then supplies the torque necessary to maintain the speed of the first flywheel 26, the second flywheel 19, and the generator 30.

If the load on the generator 30 increases to some peak load, the first flywheel 26 and the second flywheel 17 also supplies the torque required by the generator 30 to satisfy the required load. As was the case with the starting torque for the generator 30, the motor 20 is not required to supply the peak load torque because the flywheels, 26 and 17, supply that torque. Consequently, the system 10 can use a motor that has a smaller output torque capacity than the motor that would be required to handle these peak loads and reduces the overall cost of the system.

In one embodiment, the motor 20 is a 20 hp, 15 kw motor manufactured by Baltor and the motor controller 24 is an Omegapak Class 8803 Type P AC Drive, 1.5 to 150 HP, variable torque, variable frequency drive manufactured by Square D. The generator 30 is a 4 pole, 33 hp, 25 kw, asynchronous generator (i.e., an induction motor) with a synchronous speed of 1800 rpm and designed to operate at approximately 1836 rpm. The generator controller 34 is a Redistart Digital Motor Starter, RSD6 Series, (also referred to as a soft starter) manufactured by Benshaw. The first flywheel 26 has a mass of 1000 kg, the second flywheel 17 has a mass of 250 kg, and both are rotated by the motor 20 at approximately 1836 rpm. In alternative embodiments, a synchronous generator with the appropriate generator controller could be used instead of an asynchronous generator.

The applicant contemplates that various modifications to the system 10 can be made dependent upon the requirements of a given application. For example, in one variation of the first embodiment of the present invention shown in FIG. 1, the system 10 does not include the second flywheel assembly 15 and the clutch assembly 16 is connected directly between the first flywheel assembly 14 and the generator assembly 30. In a second embodiment of the invention, shown in FIG. 2, the inertia-assisted, torque-enhance gearbox 13 includes three flywheel assemblies, 46, 48, and 49, and a speed decreaser 56. The first flywheel assembly 46 is connected between the motor 20 and the speed decreaser 56, the second flywheel assembly 48 is connected between the speed decreaser 56 and the clutch assembly 16, and the third flywheel assembly 49 is connected between the clutch assembly 16 and the generator 30. The motor 20 is used to spin up the first flywheel assembly 46 to a speed that is greater than the designed operating speed of the generator 30. The speed decreaser 56 is used to step the speed of the first flywheel assembly 46 down to the designed operating speed of the generator 30. As a result, the speed decreaser 56 drives the second flywheel assembly 48 at the generator's designed operating speed. When the second flywheel assembly 48 reaches the generator's designed operating speed, the clutch assembly 16 engages and the first and second flywheel assemblies, 46 and 48, are then used to spin up the third flywheel assembly 49 and the generator 30.

Figure 2:
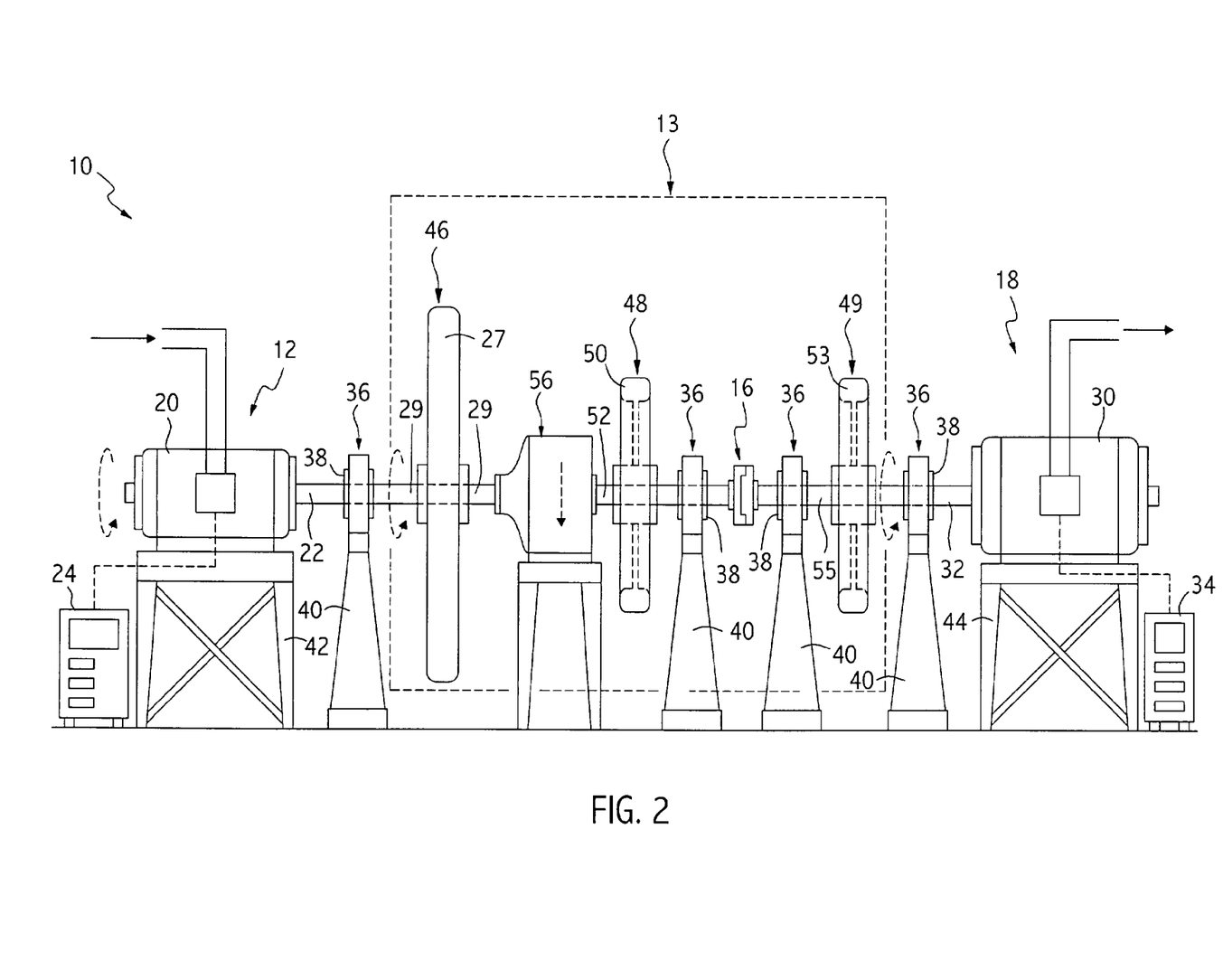
FIG. 2 is a side view of a second embodiment of the power generation system of the present invention.

All of the flywheel assemblies, 46, 48, and 49, are used to store energy and supply torque to the generator 30 when necessary. The first flywheel assembly 46 includes a first flywheel 27 and flywheel shaft 29, the second flywheel assembly 48 includes a second flywheel 50 and a second flywheel shaft 52, and the third flywheel assembly 49 includes a third flywheel 53 and a third flywheel shaft 55. The size and mass of the flywheels, 27, 50, and 53, vary and are dependent upon the torque requirements of a given application. In one version of this embodiment, the first flywheel 27 is a solid flywheel and has a mass of 1000 kg and the second and third flywheels, 50 and 53, are flywheels having spokes, i.e., they have the appearance of a bicycle tire, and a mass of 250 kg.

Figure 3:
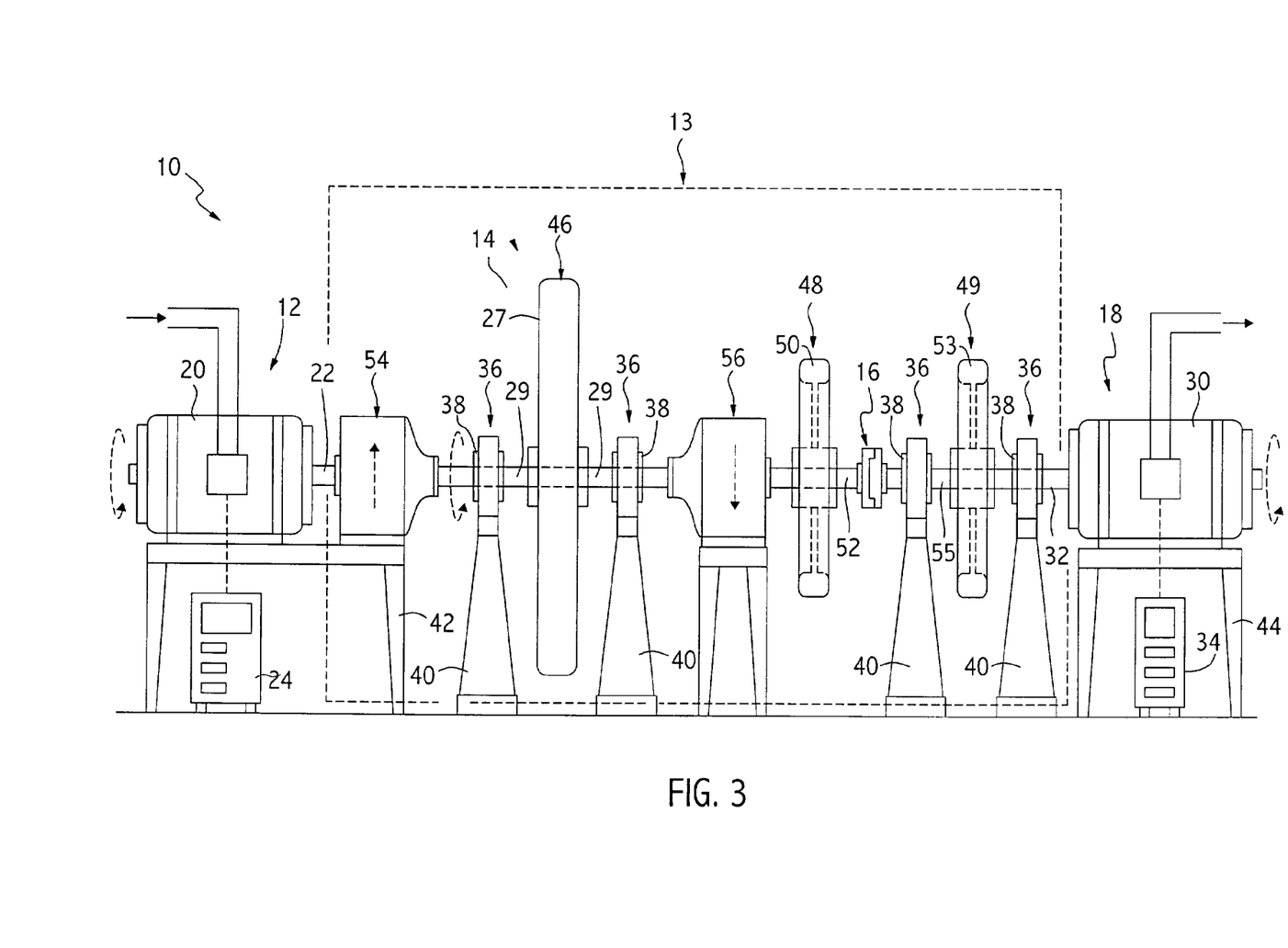
FIG. 3 is a side view of a third embodiment of the power generation system of the present invention.
Figure 4:
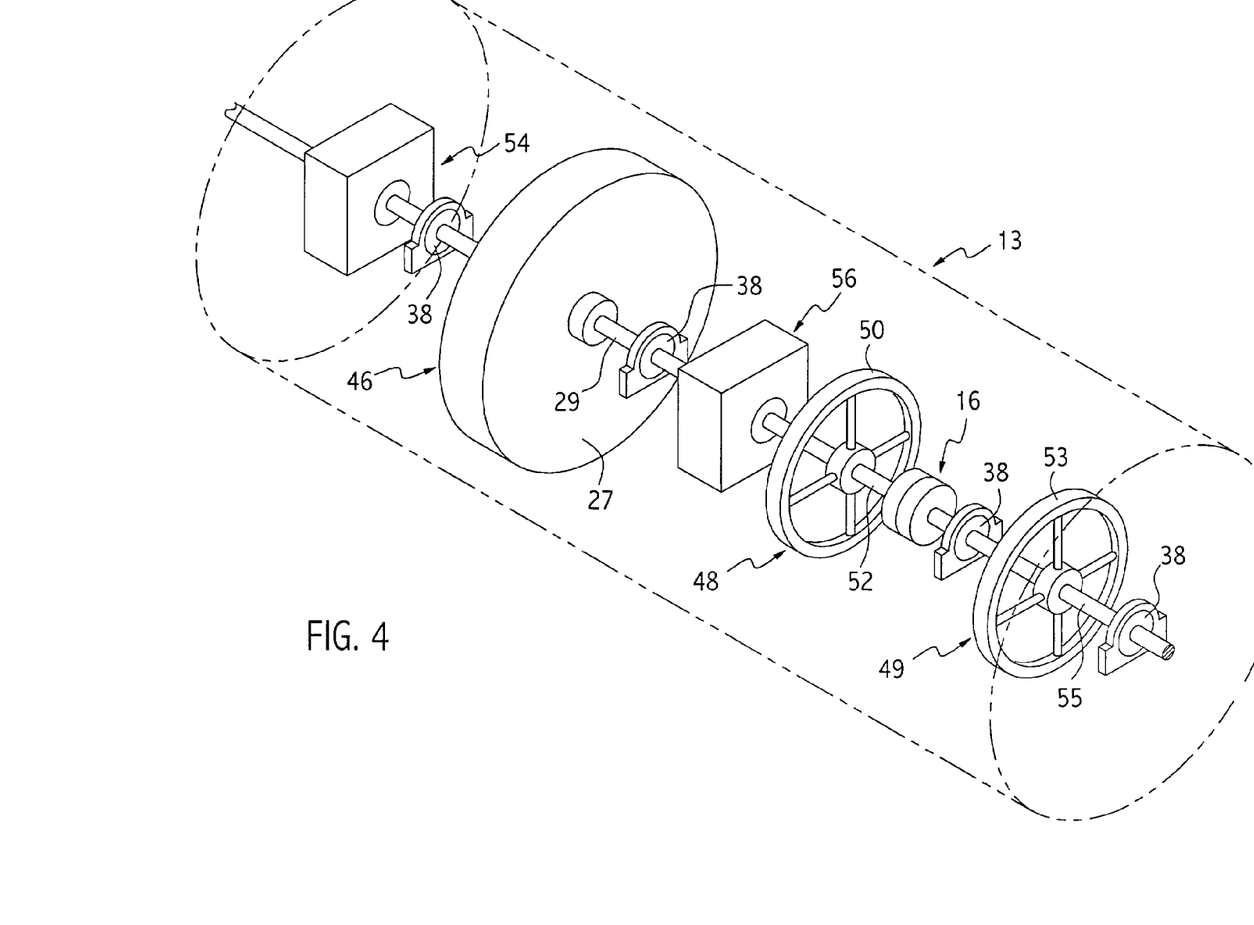
FIG. 4 is a perspective view of one embodiment of the inertia assisted torque-enhancing gearbox of the present invention.

Referring to FIGS. 3 and 4, a third embodiment of the present invention is shown. In this embodiment, the assisted—assisted, torque-enhance gearbox 13 further includes a speed increaser 54. The speed increaser 54 is connected between the motor 20 and the first flywheel assembly 46 and is used to increase the speed of the first flywheel assembly 46 to a speed that is greater than the speed of the motor 20. By increasing the speed of the first flywheel assembly 46, this embodiment increases the amount of energy stored by the first flywheel assembly 46. It is well known in the art that the energy capacity of a flywheel is proportional to the square of the rotational speed of the flywheel. Thus, an increase in the rotational speed of flywheel assembly 46 results in an increase in the energy capacity of the flywheel that is proportional to the square of the increase in speed. The amount of increase can be varied and is dependent upon the energy requirements of a given application.

The speed increaser 54 and the speed decreaser 56 can be conventional gear trains with the appropriate gear ratios. For example, in one version of this embodiment of the present invention, the speed increaser 54 is a gear train having a gear ratio of 1:5 and the speed decreaser 56 is a gear train having a gear ratio of approximately 5.44:1. The motor 20 drives the first flywheel assembly 46 at 2000 rpm and the speed increaser 54 increases this speed to 10,000 rpm and drives the first flywheel assembly 46 at that speed. The speed decreaser 56 decreases this speed to approximately 1836 rpm, which is the designed operating speed for the generator 30 in this version of the present invention, and drives the generator 30 at that speed. In other versions of this embodiment, the gear trains can be replaced with multi-speed transmissions, e.g., conventional transmissions found in an automobile, which gradually step up and step down the speed of the first flywheel assembly 46.

Figure 5:
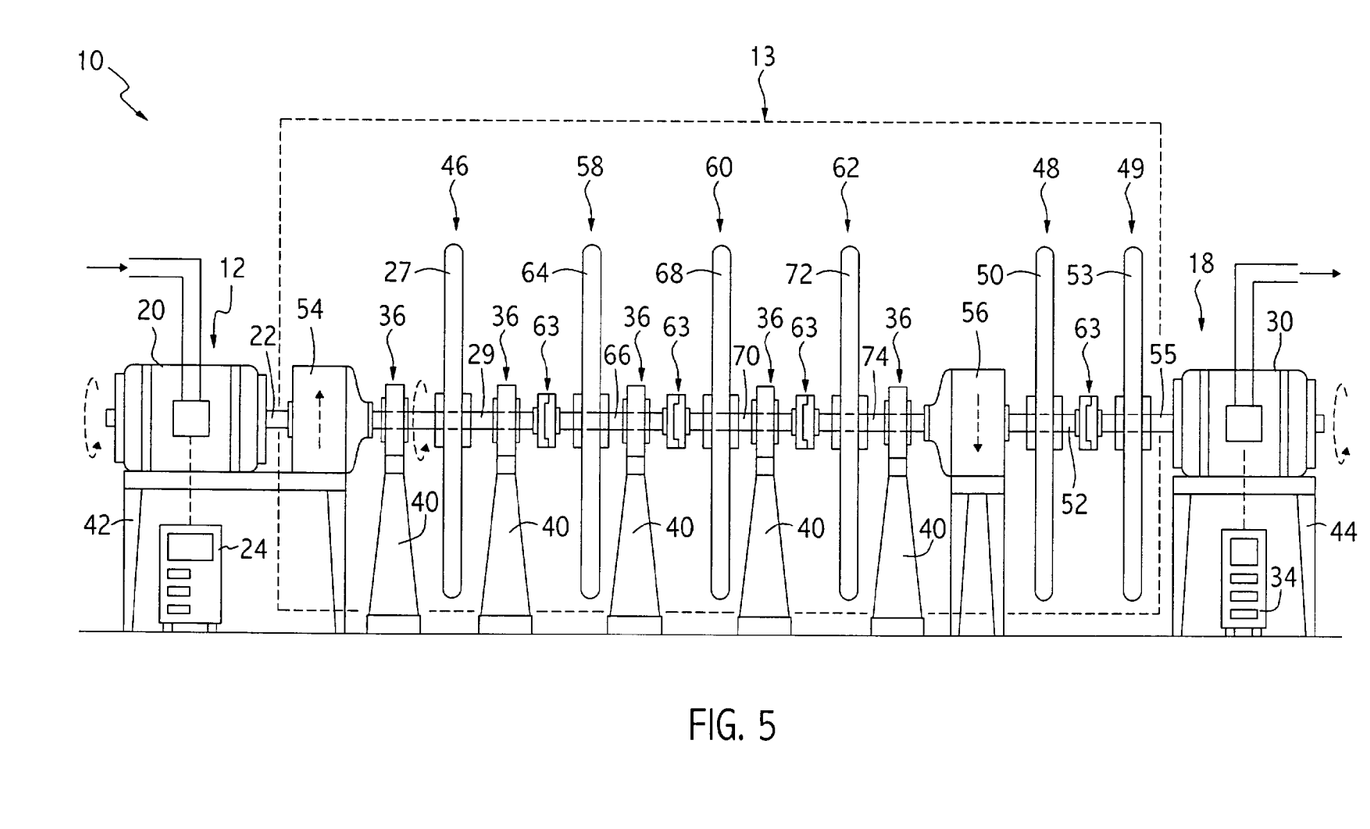
FIG. 5 is a side view of a fourth embodiment of the power generation system of the present invention.

Referring to FIG. 5, a fourth embodiment of the present invention is shown. This embodiment is similar to the embodiment shown in FIG. 3 except that inertia-assisted, torque-enhance gearbox 13 includes, in addition to the first, second, and third flywheel assemblies, 46, 48, and 49, fourth, fifth, and sixth flywheel assemblies, 58, 60, and 62, connected between the speed increaser 54 and speed decreaser 56 using multiple clutch assemblies 63. The fourth flywheel assembly 58 includes a fourth flywheel 64 and a fourth flywheel shaft 66, the fifth flywheel assembly 60 includes a fifth flywheel 68 and a fifth flywheel shaft 70, and the sixth flywheel assembly 62 includes a sixth flywheel 72 and a sixth flywheel shaft 74. The clutch assemblies 63 are similar to the clutch assembly 16 described previously in reference to FIG. 1 except that these assemblies engage and disengage at a much higher speed. For example, in one version of this embodiment, the clutch assemblies 63 engage at approximately 10,000 rpm and disengage when the speed falls a certain percentage below this speed.

In this embodiment, the motor 20 and the speed increaser 54 are used to spin the first flywheel assembly 46 up to a designed speed that is greater than the speed of the motor. As indicated previously, this speed may vary and is based on the energy requirements of a given application. After the first flywheel assembly 46 reaches the design speed, the clutch assembly 63 between the first flywheel assembly and the fourth flywheel assembly 58 engages and the first flywheel assembly 46 is used to spin up the fourth flywheel assembly 58. When the fourth flywheel assembly 58 reaches the design speed, the clutch assembly 63 between the fourth flywheel assembly 58 and the fifth flywheel assembly 60 engages and the first and fourth flywheel assemblies are used to spin up the fifth flywheel assembly 62. When the fifth flywheel assembly 62 reaches the design speed, the clutch assembly 63 between the fifth flywheel assembly 60 and the sixth flywheel assembly 62 engages and the first, fourth, and fifth flywheel assemblies, 46, 58, and 60, are used to spin up the sixth flywheel assembly 62. Once the sixth flywheel assembly 62 reaches the design speed, clutch assembly 16 engages and the first, fourth, fifth, and sixth flywheel assemblies 46, 58, 60, and 62, are then used to spin up the second and third flywheel assembly, 48 and 49, and the generator 30.

All of the flywheel assemblies, 46, 58, 60, 62, 48, and 49 are used to store energy and supply torque to the generator 30 when necessary. The size and mass of the flywheels in each of these assemblies, as well as the design speed for these assemblies, can vary and is dependent upon the torque and energy requirements of a given application.

Figure 6:
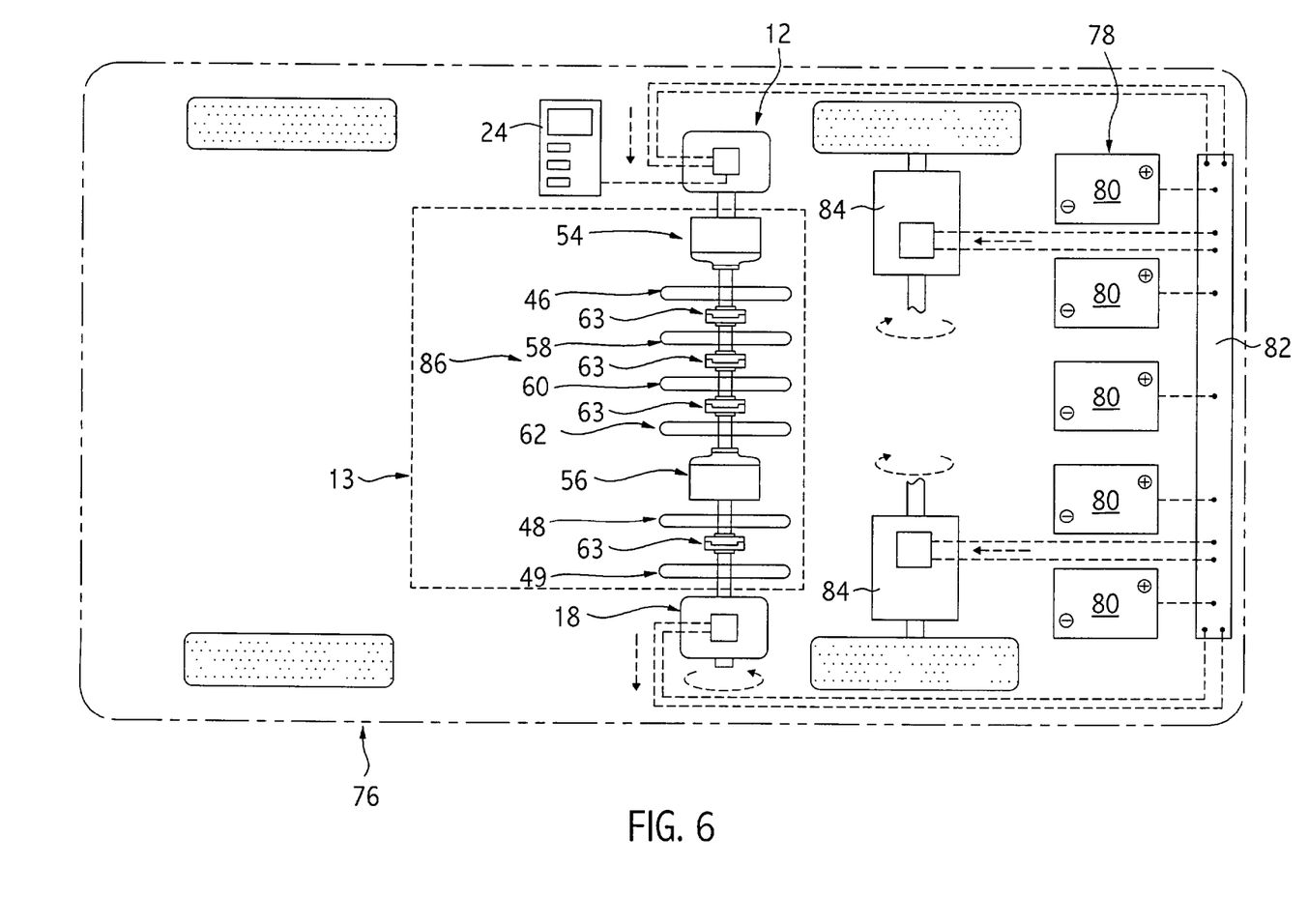
FIG. 6 is a top view of a fifth embodiment of the power generation system of the present invention in an automobile.

A fifth embodiment of the present invention is shown in FIG. 6. This embodiment includes the fourth embodiment of the present invention, discussed previously in reference to FIG. 5, integrated into a motorized vehicle 76. This version also includes a battery pack 78, having a series of batteries 80, connected to bus 82 and two motors, 84, that are operable to drive the rear wheels of the motorized vehicle 76. The battery pack 78 is used to drive the system 86, which generates power that is used to recharge the battery pack 78. The battery pack 78 is also used to drive the motors 84, which drive the rear wheels of the motorized vehicle 76.

Figure 7:
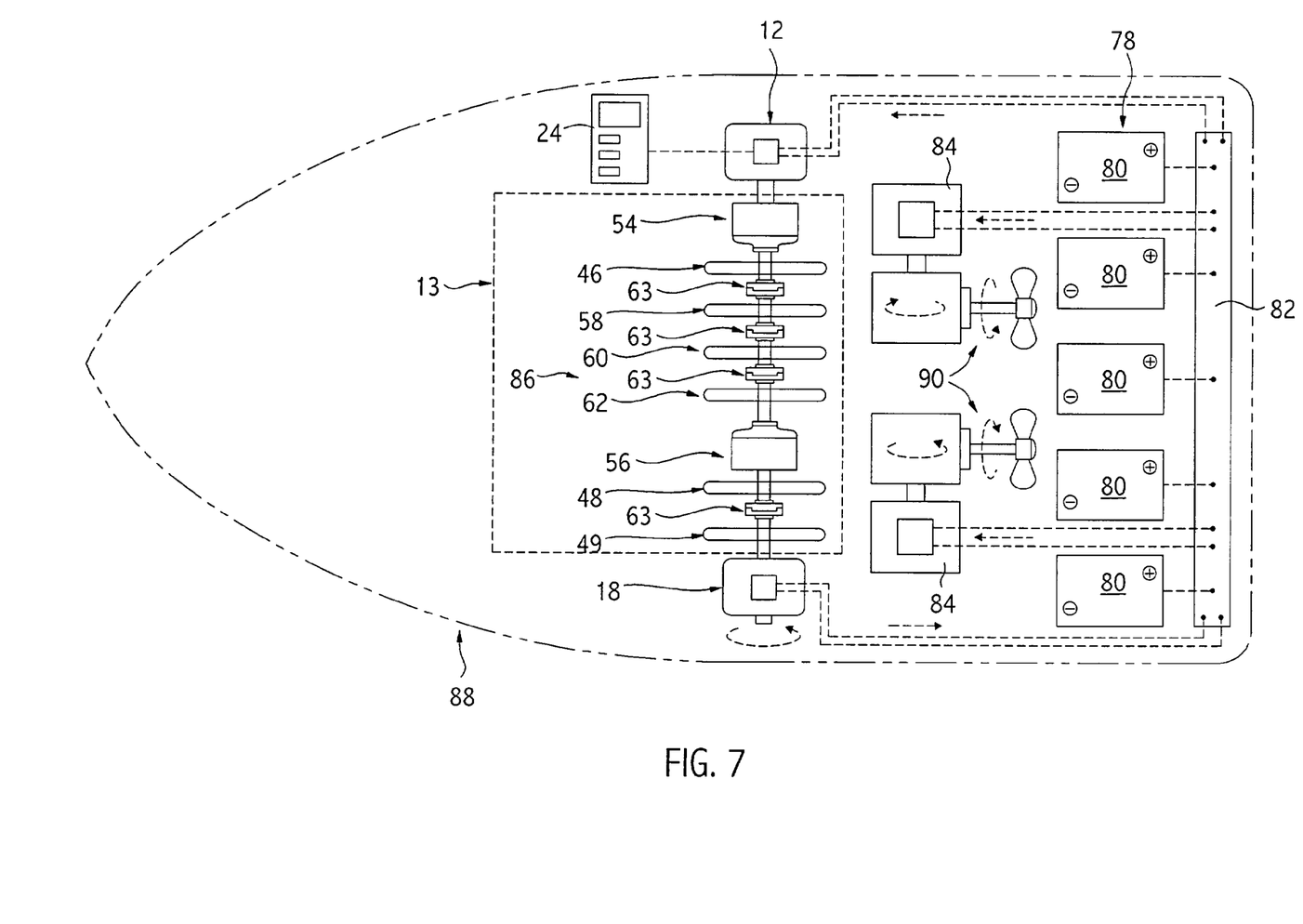
FIG. 7 is a top view of a sixth embodiment of the power generation system of the present invention in a boat.

In FIG. 7, a sixth embodiment of the present invention is shown. As was the case with the fifth embodiment shown in FIG. 6, this embodiment includes the fourth embodiment of the present invention. In this embodiment, however, the fourth embodiment is integrated into a marine vessel 88. This version also includes a battery pack 78, having a series of batteries 80, connected to bus 82 and two motors, 84. The motors 84 are operable to drive two propeller assemblies 90 on the marine vessel 88. The battery pack 78 is used to drive the system 86, which generates power that is used to recharge the battery pack 78. The battery pack 78 is also used to drive the motors 84, which drive the propeller assemblies 90 of the marine vessel 88.

Thus, although there have been described particular embodiments of the present invention of a new and useful System and Method for Generating Power, it is not intended that such references be construed as limitations upon the scope of this invention except as set forth in the following claims.

What is claimed is:

1. A system for generating power, comprising:
    a motor assembly;
    an inertia-assisted, torque-enhanced gearbox coupled to the motor assembly; and
    a generator assembly coupled to the inertia-assisted, torque-enhanced gearbox,
    wherein the inertia-assisted, torque-enhanced gearbox includes a first flywheel assembly coupled to the motor assembly, and a clutch assembly coupled to the first flywheel assembly and the generator assembly, and
    wherein the gearbox includes a second flywheel assembly coupled between the clutch assembly and the generator, said clutch assembly being disposed between said first flywheel assembly and said second flywheel assembly for enabling selective disengagement of said second flywheel assembly from said first flywheel assembly.

2. The system of claim 1, wherein:
the motor assembly is operable to supply operating torque to the generator assembly; and
the flywheel assemblies are operable to supply starting and peak load torques to the generator assembly.

3. The system of claim 2, wherein the gearbox includes:
a third flywheel assembly coupled between the first flywheel assembly and the clutch assembly; and
a speed decreaser coupled between the first flywheel assembly and the third flywheel assembly.

4. The system of claim 3, wherein the motor assembly includes a motor controller and the generator includes a generator controller.

5. The system of claim 4, wherein:
the motor controller is a variable frequency drive; and
the generator controller is a soft starter.

6. The system of claim 5, wherein the generator assembly includes a synchronous generator or an asynchronous generator.

7. A The system for generating power according to claim 1, further comprising:
a speed increaser coupled to the motor assembly;
said first flywheel assembly being coupled to the speed increaser; and
a speed decreaser coupled to said first flywheel assembly.

8. The system of claim 7, wherein the speed increaser and the speed decreaser are gear trains having predetermined gear ratios.

9. The system of claim 8, wherein the speed increaser and the speed decreaser are multi-speed transmissions.

10. The system of claim 9, further including a third flywheel assembly coupled between the clutch assembly and the generator assembly.

11. The power generation system according to claim 1, further comprising:
a battery pack connected to the motor assembly and the generator assembly,
wherein said power generation system supplies power to one of a motorized vehicle and a marine vessel.

12. The system of claim 11, wherein:
the motorized vehicle is an automobile; and
the system further includes a wheel drive motor connected to the battery pack and a wheel assembly on the automobile.

13. The system of claim 11, wherein:
the marine vessel is a boat; and
the system further includes a propeller drive motor connected to the battery pack and a propeller on the boat.

14. A power generating system, comprising:
a motor assembly;
a speed increaser coupled to the motor assembly;
a first flywheel assembly coupled to the speed increaser;
a first clutch assembly coupled to the first flywheel assembly;
a second flywheel assembly coupled to the first clutch assembly;
a second clutch assembly coupled to the second flywheel assembly;
a third flywheel assembly coupled to the second clutch assembly;
a third clutch assembly coupled to the third flywheel assembly;
a fourth flywheel assembly coupled to the third clutch assembly;
a speed decreaser coupled to the fourth flywheel assembly;
a fourth clutch assembly coupled to the speed decreaser assembly; and
a generator assembly coupled to the fourth clutch assembly.

15. The system of claim 14, further including a fifth flywheel assembly coupled between the fourth clutch assembly and the generator assembly.

16. The system of claim 15, further including a sixth flywheel assembly coupled between the fourth clutch assembly and the speed decreaser.

17. The system of claim 16, wherein the speed increaser and the speed decreaser are gear trains having predetermined gear ratios.

18. The system of claim 17, wherein the speed increaser and the speed decreaser are multi-speed transmissions.

* * * * *